(12) United States Patent
Urbes et al.

(10) Patent No.: US 7,118,422 B2
(45) Date of Patent: Oct. 10, 2006

(54) SIGNAL DISTRIBUTION INSTALLATION

(75) Inventors: Flavien Urbes, Voiron (FR); Pierre Feugere, Saint-Verand (FR)

(73) Assignee: Arnould Fabrique d'Appareillage Electrique, Saint-Marcellin (FR)

( * ) Notice: Subject to any disclaimer, the term of this patent is extended or adjusted under 35 U.S.C. 154(b) by 201 days.

(21) Appl. No.: 10/831,152

(22) Filed: Apr. 26, 2004

(65) Prior Publication Data

US 2005/0032418 A1   Feb. 10, 2005

(30) Foreign Application Priority Data

Apr. 24, 2003  (FR)  ................... 03 05045

(51) Int. Cl.
*H01R 25/00* (2006.01)
(52) U.S. Cl. ..................... 439/653; 361/704
(58) Field of Classification Search ............... 439/653, 439/61, 76.1, 105; 174/60; 361/704, 709
See application file for complete search history.

(56) References Cited

U.S. PATENT DOCUMENTS

| | | | | |
|---|---|---|---|---|
| 5,893,763 | A * | 4/1999 | O'Connor et al. | 439/76.1 |
| 6,028,769 | A * | 2/2000 | Zurek | 361/704 |
| 6,261,107 | B1 * | 7/2001 | Takase et al. | 439/79 |
| 6,503,108 | B1 * | 1/2003 | Kikuchi et al. | 439/680 |
| 6,605,780 | B1 * | 8/2003 | Chiriku et al. | 174/60 |
| 6,875,031 | B1 * | 4/2005 | Korsunsky et al. | 439/79 |
| 6,991,471 | B1 * | 1/2006 | Hayashi et al. | 439/61 |
| 2003/0186580 | A1 * | 10/2003 | Dambach et al. | 439/497 |

FOREIGN PATENT DOCUMENTS

| | | |
|---|---|---|
| EP | 0 724 365 | 7/1996 |
| EP | 1 069 784 | 1/2001 |
| EP | 1 079 491 | 2/2001 |
| GB | 2 317 996 | 4/1998 |
| WO | WO 98/56223 | 12/1998 |
| WO | WO 03/003758 | 1/2003 |
| WO | WO 03/028369 | 4/2003 |

\* cited by examiner

*Primary Examiner*—Chandrika Prasad
(74) *Attorney, Agent, or Firm*—Young & Thompson

(57) ABSTRACT

A wiring concentrator comprises a first terminal for a television signal distribution cable, a second terminal for a telephone network cable, and a plurality of third terminals for respective local area network cables, first, second and third connectors for respective active electronic units for processing television signals, telephone signals and local area network signals, respectively, and a printed circuit board connecting the first terminal to the first connector, the second terminal to the second connector, and each of the third terminals to each of the first, second and third connectors. A signal distribution unit comprises the above concentrator and at least one of the above active electronic units. A cabinet comprises a signal distribution unit and a DC electrical power supply unit.

30 Claims, 5 Drawing Sheets

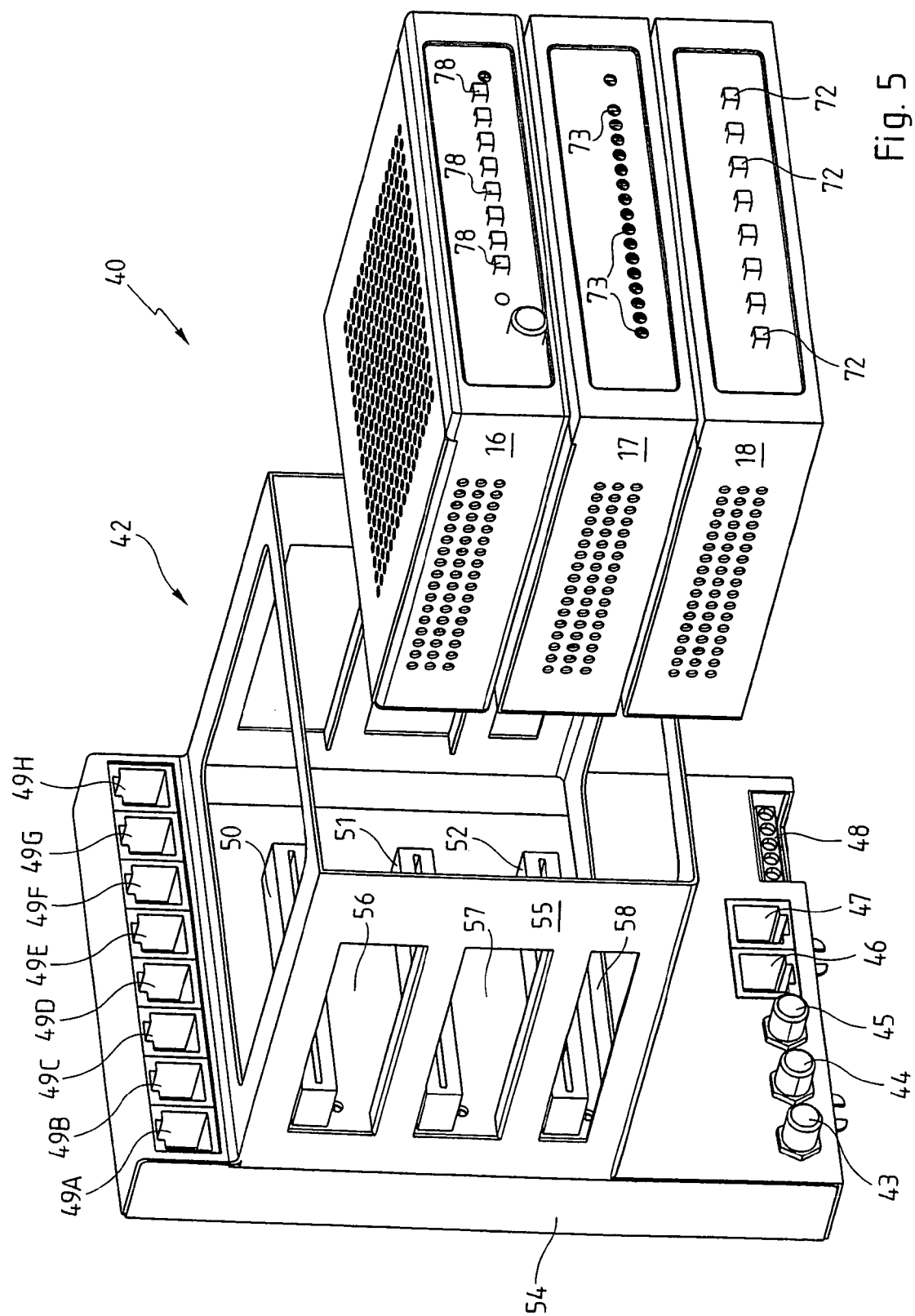

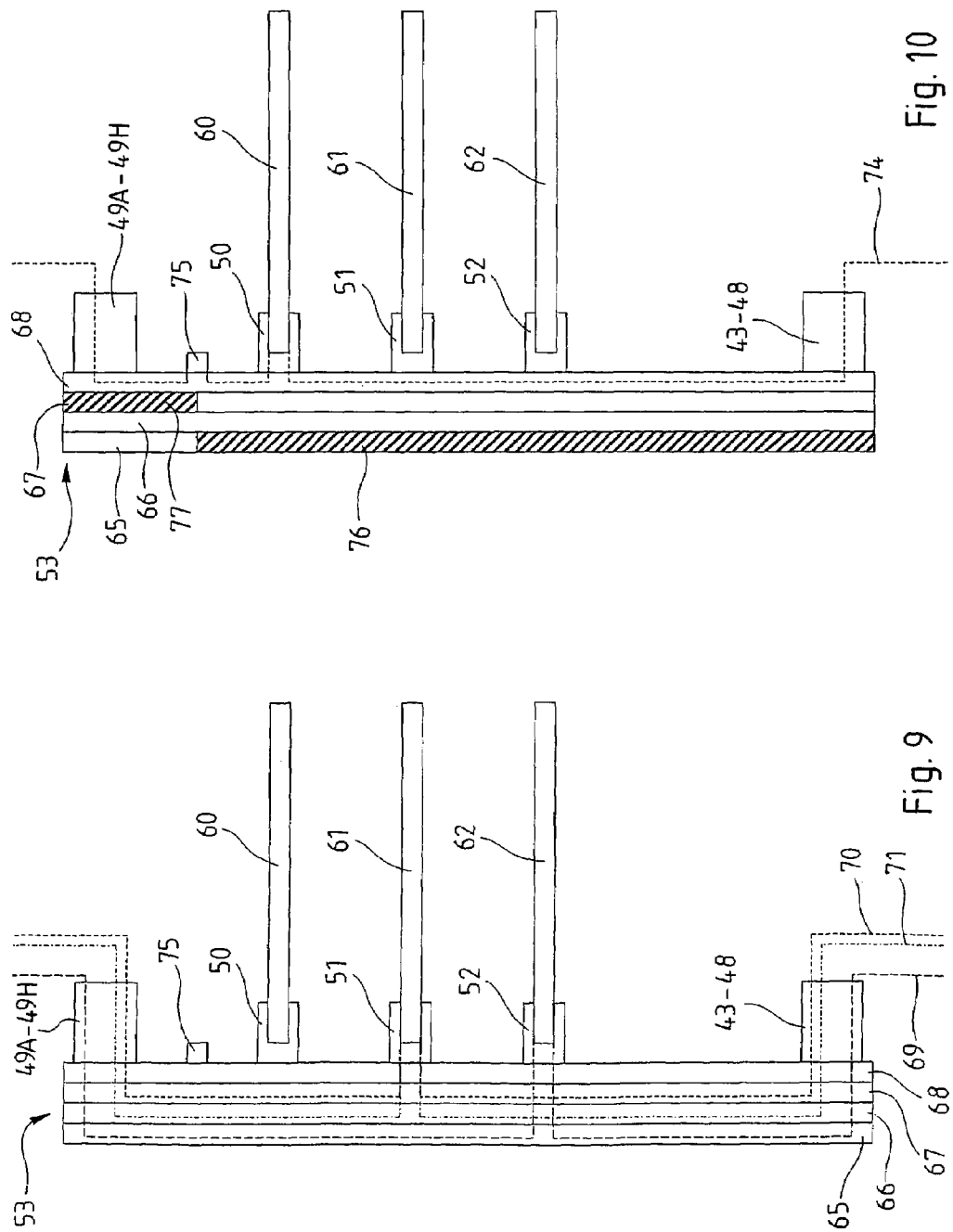

SIGNAL DISTRIBUTION INSTALLATION

BACKGROUND OF THE INVENTION

1. Field of the Invention

The invention relates to installations for distributing signals in a residential or tertiary building.

2. Description of the Prior Art

The invention aims to provide a simple, convenient and economical way of distributing television, telephone network and local area network signals.

SUMMARY OF THE INVENTION

To this end it proposes a wiring concentrator comprising:
- a first connection terminal adapted to receive a television signal distribution cable;
- a second connection terminal adapted to receive a telephone network cable;
- a plurality of third connection terminals each adapted to receive a local area network cable;
- a first connector adapted to receive an active electronic unit for processing television signals;
- a second connector adapted to receive an active electronic unit for processing telephone signals;
- a third connector adapted to receive an active electronic unit for processing local area network signals;
- a printed circuit board to which each of the first, second and third connection terminals and each of the first, second and third connectors are connected, the printed circuit board connecting the first connection terminal to the first connector, the second connection terminal to the second connector, and each of the third connection terminals to each of the first, second and third connectors, and
- a chassis on which the printed circuit board, each of the first, second and third connection terminals, and each of the first, second and third connectors are mounted, which chassis includes a housing for each active electronic unit.

It is seen that the wiring concentrator of the invention is used to dispose, on each of the third connection terminals, signals available at the first connector, at the second connector, and at the third connector, which connectors have access to signals present at the first connection terminal, the second connection terminal, and each third connection terminal, respectively.

The wiring concentrator of the invention therefore offers the facility of placing on each cable received in a third connection terminal signals of different kinds reaching the wiring concentrator via the first connection terminal, the second connection terminal and the third connection terminals and processed by active electronic units adapted to be received respectively in the first connector, the second connector, and the third connector.

Providing a printed circuit board to make the connections between the connection terminals and the connectors provides a particularly simple, convenient and economical way to make these connections in compliance with constraints relating to protection against attenuation of and/or interference with the signals.

Providing connectors to receive the active electronic units and dedicating each connector to one type of signal is particularly advantageous for the installer and/or the user of the signal distribution installation of which the wiring concentrator is part, in particular with regard to maintenance and/or modification.

Features that are preferred for reasons of simplicity and convenience include:
- the third connection terminals are grouped in a line and each of the first, second and third connectors is elongate, with the third terminals, the first connector, the second connector, and the third connector which are disposed in successive rows; and where applicable
- the first connector is nearest the third connection terminals; and where applicable
- the second connector is farthest from the third connection terminals with the third connector which is between the first connector and the second connector; and/or
- the first connection terminal and the second connection terminal are grouped in a line, with the third connection terminals, the first connector, the second connector, the third connector, and the group comprising the first terminal and the second terminal which are disposed in successive rows.

According to other features preferred for reasons of simplicity and convenience:
- the first connection terminal and the second connection terminal are disposed at a first end of the concentrator;
- the third connection terminals are disposed at a second end of the concentrator; and
- the first connector, the second connector and the third connector are between the first end and the second end with the first connector, which is nearest the second end.

The second connector is preferably nearest the first end and the third connector is between the first connector and the second connector.

According to other features preferred for reasons of simplicity and convenience and enhanced application possibilities:
- the concentrator of the invention further comprises a fourth connection terminal adapted to receive a second television signal distribution cable; and where applicable
- the printed circuit board carries a distributor having an input connected to the first connection terminal, a first output for terrestrial television signals connected to the first connector, and a second output for all television signals connected to the fourth connection terminal; and/or
- the concentrator according to the invention further comprises a fifth connection terminal adapted to receive a third television signal distribution cable; and where applicable
- the printed circuit board carries a coupler having a first input connected to the first terminal, a second input connected to the fifth terminal, and an output connected to the first connector; and/or
- the concentrator according to the invention further comprises a fourth connection terminal adapted to receive a second television signal distribution cable and a fifth connection terminal adapted to receive a third television signal distribution cable, and the printed circuit board carries a distributor-coupler having a first input connected to the first connection terminal, a second input connected to the fifth connection terminal, a first output, for terrestrial television signals, connected to the first connector, and a second output, for all television signals, connected to the fourth connection terminal; and/or
- the concentrator according to the invention further comprises a sixth connection terminal adapted to receive a local area network cable, with the printed circuit board which connects the sixth connection terminal to the second terminal and to the third connector; and/or the concentrator according to the invention further comprises a seventh connection terminal adapted to receive a telephone network cable, with the printed circuit board which connects the second connection terminal to the seventh connection terminal; and/or the concentrator according to the invention further comprises at least one connection terminal other than the first connection terminal, the second connection terminal or the third connection terminal, with the first connection terminal, the second connection terminal, and each of the other connection terminals grouped in a line.

According to other features preferred for reasons of simplicity and convenience:

the printed circuit board has a plurality of stacked layers each comprising a dielectric substrate and conductive metal tracks or lands on the substrate; and where applicable the printed circuit board has a first layer and a second layer for connecting the first connection terminal to the first connector; and where applicable the printed circuit board carries, for each of the third terminals, a converter for converting an unbalanced signal into a balanced signal, with each of the converters having an input connected to the first connector by the first layer and by the second layer, and an output connected to the third connection terminal via only the second layer; and where applicable each converter is between the third connection terminal and the first connector; and/or each of the connection terminals and each of the connectors is disposed on the same side of the printed circuit board, with the first layer that is farthest from it and with the second layer that is nearest it; and/or the first layer of the printed circuit board carries conductive tracks for connecting the second connection terminal to the second connector and for connecting the second connector to each of the third connection terminals; and/or the printed circuit board carries between the first layer and the second layer a third layer comprising conductive tracks for connecting each of the third connection terminals to the third connector; and where applicable the printed circuit board comprises a fourth layer carrying other conductive tracks for connecting each of the third connection terminals to the third connector.

According to other features preferred for reasons of simplicity and convenience:

the first connection is to an F format terminal, the second connection terminal is a screw terminal block and the third connection terminals are RJ 45 format terminals; and/or each of the first, second and third connectors is adapted to accommodate a portion of a printed circuit board.

A second aspect of the invention provides a signal distribution unit comprising a wiring concentrator as defined above and at least one active electronic unit for processing television signals, one active electronic unit for processing telephone signals, and one active electronic unit for processing local area network signals disposed in one of the housings of the chassis and received in a respective one of the first, second and third connectors.

According to other features preferred for reasons of simplicity and convenience:

each active electronic unit comprises an electronic circuit board and a casing having on a front panel at least one display member and/or one configuration member and at the rear a plug for connection to one of the first, second and third connectors; and where applicable each of the connection plugs is part of a printed circuit board of the active electronic unit.

The invention further provides, for reasons of simplicity and convenience, especially in the plant room of a building, a cabinet for a signal distribution installation, comprising at least one signal distribution unit as defined above and a DC power supply unit.

According to other features preferred for reasons of simplicity and convenience, the cabinet further comprises a patch panel and/or at least one test telephone jack.

The explanation of the invention continues now with the description of one embodiment given hereinafter by way of illustrative and nonlimiting example and with reference to the appended drawings.

BRIEF DESCRIPTION OF THE DRAWINGS

FIG. 5 is an exploded perspective view of a signal distribution unit contained in the cabinet.

FIG. 9 is a schematic of the signal distribution unit showing in a very general manner the path of telephone signals and local area network signals and not showing either the chassis of the wiring concentrator or the casing of each of the three active electronic units.

FIG. 10 is a similar view showing the path of television signals.

DETAILED DESCRIPTION OF THE PREFERRED EMBODIMENT

Figure 1:
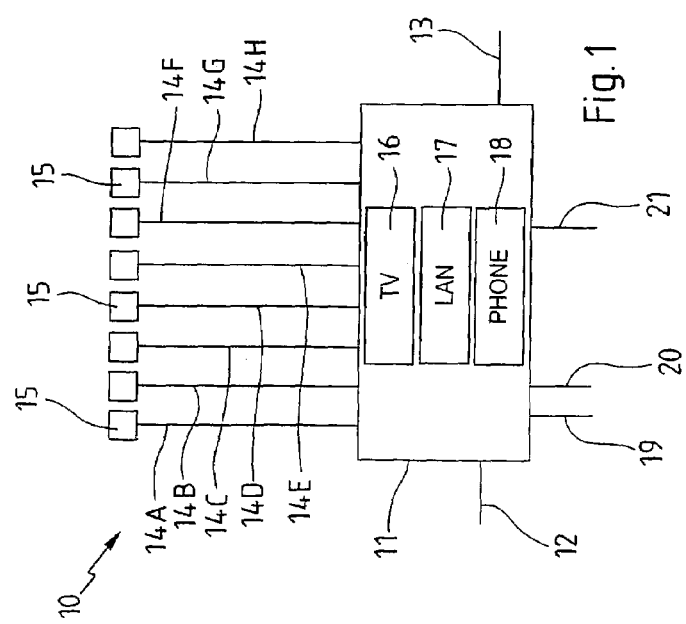
FIG. 1 is a block schematic of a signal distribution installation including a cabinet according to the invention.

The signal distribution installation 10 depicted in FIG. 1 includes a cabinet 11 at which terminate a coaxial cable 12 for distributing television signals, a cable 13 connected to a public switched telephone network and eight local area network cables 14A to 14H.

The installation 10 is part of a residential or tertiary building and the cabinet 11 is disposed in the plant room of the building.

The television signal distribution coaxial cable 12 is connected to a coupler that is connected firstly to a receive antenna or to a terrestrial broadcast distribution cable network and secondly to a satellite transmission receive antenna.

The telephone cable 13 comprises two pairs of conductors. It is connected to a telephone exchange which provides a line on each of the two pairs of the cable 13.

Each of the local area networks 14A to 14H is of the conventional type with four twisted pairs of conductors, here of category 6. In the building of which the installation 10 is part, each of these cables runs between the cabinet 11 and a respective RJ 45 category 6 jack 15.

Each of the cables 14A to 14H is adapted to distribute not only local area network signals and telephone signals but also television signals.

Figure 2:
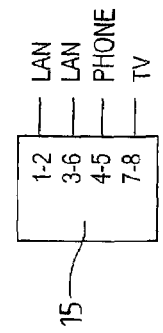
FIG. 2 is a block diagram indicating the nature of the signals present at each of the four pairs of contacts of jacks of the installation.

FIG. 2 shows how the jacks 15 are wired.

It is seen that the pair of contacts 1 and 2 and the pair of contacts 3 and 6 are for local area network (LAN) signals, the pair of contacts 4 and 5 is for telephone (PHONE) signals, and the pair of contacts 7 and 8 is for television (TV) signals.

The contacts for the local area network and telephone signals being laid out in the standard manner, the user connects conventionally to the jack 15 a telephone or a local area network device, if necessary using a conventional doubler to connect two local area network devices or one such device and a telephone.

To connect a television set, an adapter is plugged into the jack 15 and a coaxial cable is connected between the adapter and the television set. Alternatively, the coaxial cable and the adapter may be parts of the same cord.

The adapter includes a converter for converting the balanced signal on the twisted pair of conductors terminating at the contacts 7 and 8 of the jack 15 into an unbalanced signal that may be transmitted over the coaxial cable.

For television signals, telephone signals and local area network signals to be present on the twisted pairs of conductors of the cables 14A to 14H, the cabinet 11 contains an active electronic unit 16 for processing television signals, an active electronic unit 17 for the local area network and a telephone active electronic unit 18, with the cable 12 that is connected to the unit 16, the cable 13 that is connected to the unit 18, and each of the cables 14A to 14H that is connected to each of the units 16, 17 and 18.

The electronic units 16, 17 and 18 are active in particular in the sense that they require an electrical power supply to operate.

In addition to the cables 12, 13 and 14A to 14H, there further terminate at the cabinet 11 a coaxial cable 19 for distributing television signals, a coaxial cable 20 for connection to a modulator producing terrestrial television signals, and a telephone cable 21.

The cables 19 and 20 are each connected to a distributor-coupler (not shown) that is carried by a printed circuit board and is part of a wiring concentrator in the cabinet 11 (see below). The distributor-coupler has two inputs connected to the cable 12 and to the cable 20, respectively, and two outputs connected to the unit 16 and to the cable 19, respectively.

The output for the unit 16 carries only terrestrial television signals from the cable 12 and the cable 20. The output for the cable 19 carries all signals from the cable 12 only. The connection to the unit 16 made by the distributor-coupler is a one-way connection: signals from the cable 20 do not appear either on the cable 12 or on the cable 19.

The cable 19 serves a conventional television signal distribution jack (not shown) having a first terminal for terrestrial television signals and a second terminal for satellite television signals.

The telephone cable 21 is of the same type as the cable 13, in other word it comprises two pairs of conductors. The cables 13 and 21 are connected via the printed circuit board mentioned above: this board connects each of the four conductors of the cable 13 to the connector 52 and to the jack 47. The cable 21 is connected to a conventional telephone jack (not shown) at which are present the two lines each carried by one of the pairs of conductors of the cable 13 and the cable 21.

The cabinet 11 is described in more detail next with reference to FIGS. 3 and 4.

Figure 3:
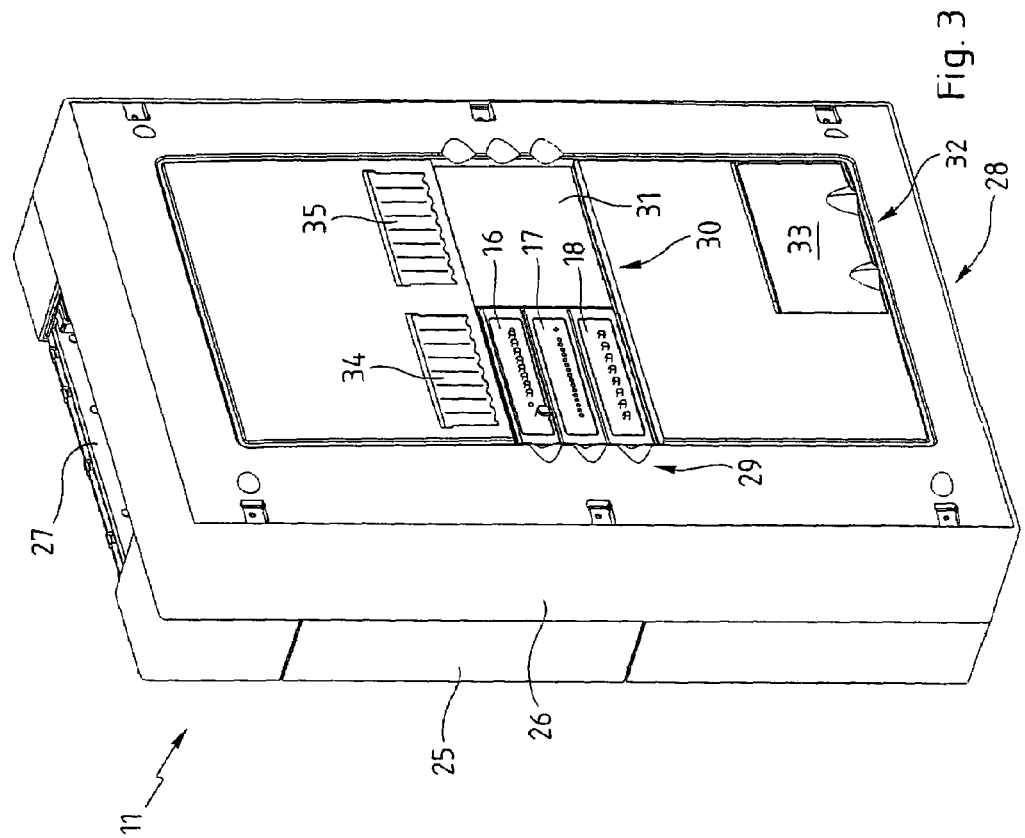
FIG. 3 is a perspective view of the cabinet included in the signal distribution installation depicted in FIG. 1.

As may be seen in FIG. 3, the cabinet 11 comprises a base 25 and a cover 26 together forming a closed enclosure in which the face that is at the top in FIG. 3 includes a passage 27 for the cables 14A to 14H and the face that is at the bottom in FIG. 3 includes a similar passage 28 for the cables 12, 13 and 19 to 21. In practice, the passages 27 and 28 are formed in the base 25.

The front panel of the cabinet 11, which is part of the cover 26, includes a window 29 through which can be seen the front face of each of the units 16, 17 and 18. A similar window 30 is disposed alongside the window 29 and in this example is closed by a blanking plate 31.

The front panel of the cover 26 includes a further window 32 closed by a pivoted shutter 33 concealing telephone jacks for testing correct connection to the public telephone network (see below).

Finally, a label-holder 34 with eight label positions is provided for labeling the jacks 15 at each of which one of the cables 14A to 14H terminates. A similar label-holder 35 is provided alongside the label-holder 34.

The cabinet 11 is generally designed to accommodate, if required, in addition to the signal distribution unit comprising the active electronic units 16, 17 and 18, a second and similar distribution unit. In this case, the blanking plate 31 is removed to expose the front faces of the active electronic units of the second signal distribution unit and the label-holder 35 is used to identify the locations at which the eight additional local area network cables connected to the second signal distribution unit terminate.

Figure 4:
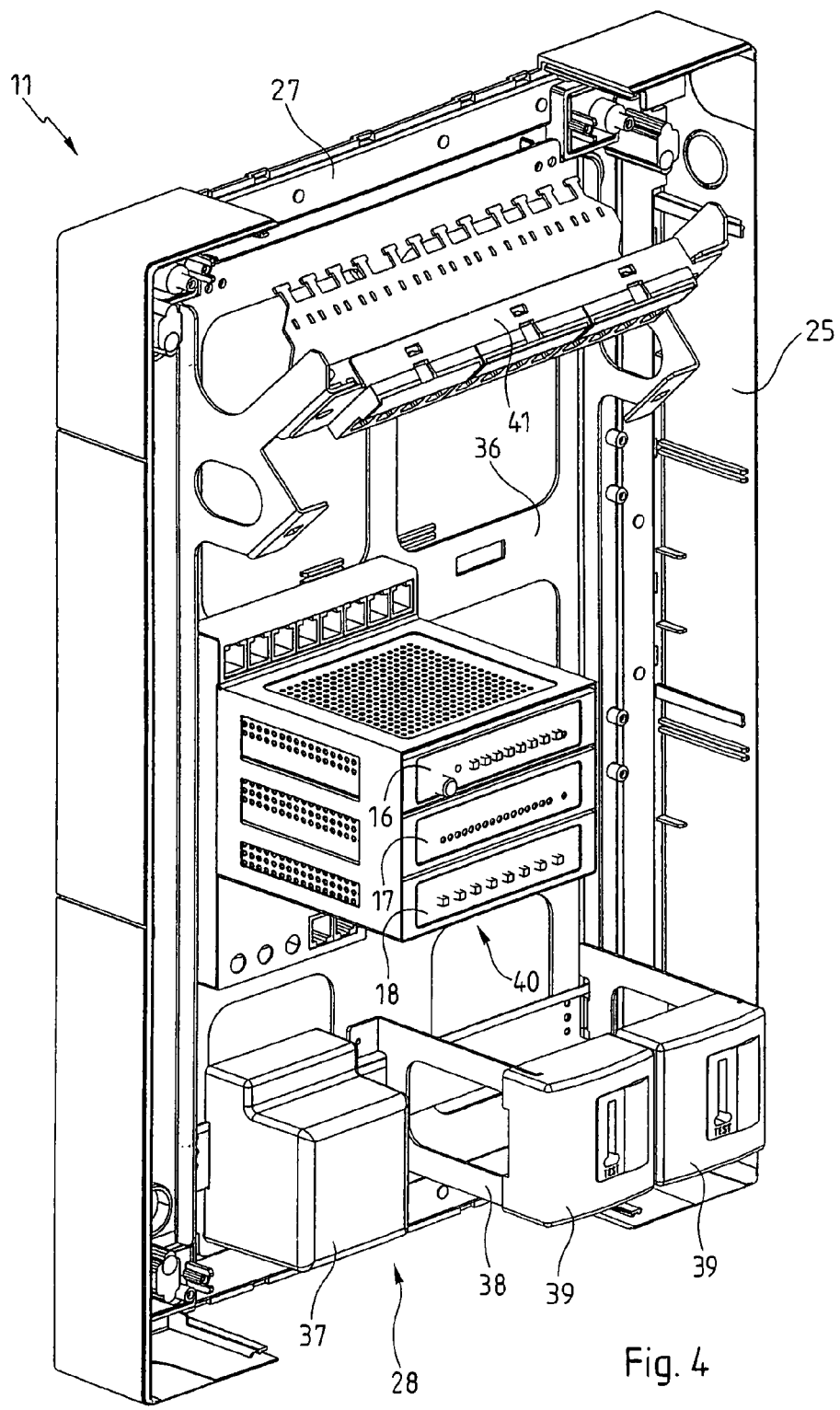
FIG. 4 is another perspective view of the cabinet, shown with its closure cover removed.

As may be seen in FIG. 4, the cabinet 11 comprises a metal chassis 36 fixed to the base 25.

On the chassis 36 are mounted a DC power supply unit 37, a support 38 for telephone test jacks 39, a signal distribution unit 40, and a patch panel 41 carrying RJ 45 category 6 jacks.

To expand the installation 10, if required, the chassis 36 is designed to receive a second signal distribution unit 40 and a second patch panel 41. The location to receive the second signal distribution unit may be seen in FIG. 4 to the right of the unit 40 and the location for the second patch panel may be seen in FIG. 4 below the panel 41.

The unit 40 is described next with reference to FIGS. 5 to 6 and 8 to 10.

The unit 40 comprises the active electronic units 16, 17 and 18 and a wiring concentrator 42.

Figure 6:
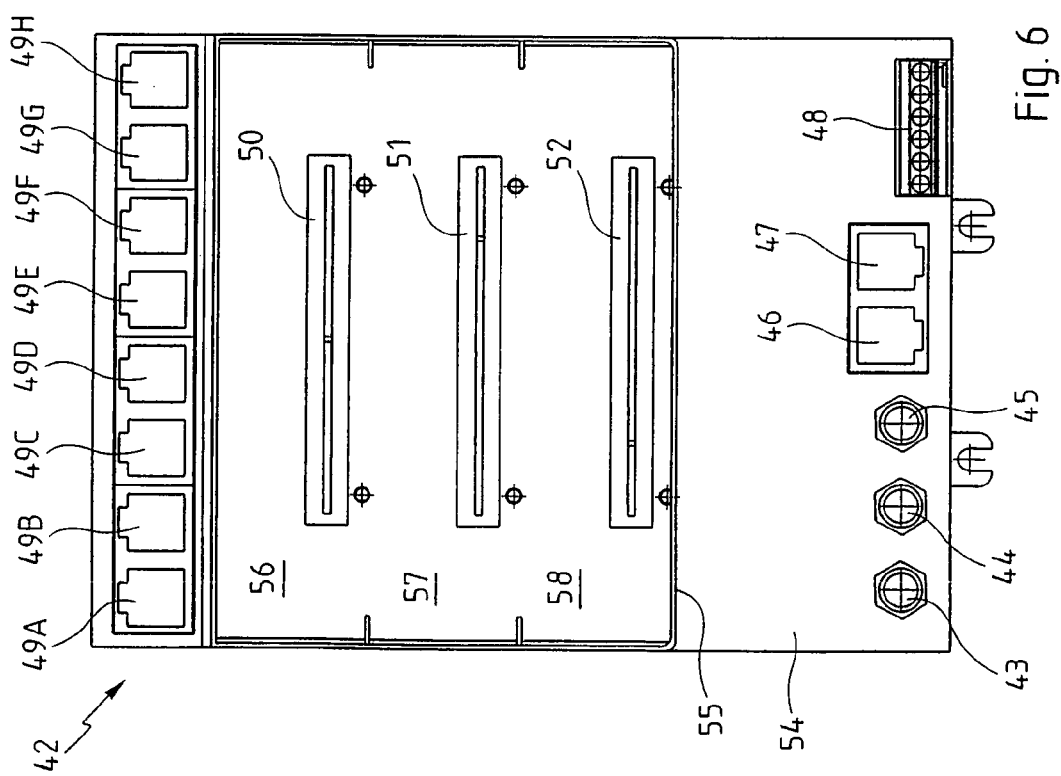
FIG. 6 is a front elevation view of a wiring concentrator included in the signal distribution unit.

The concentrator 42 has in its lower portion three F plugs 43, 44 and 45, two RJ 45 category 6 jacks 46 and 47, and a six-way screw terminal block 48 (see FIG. 6).

The plugs 43 to 45 receive the coaxial cable 12, the coaxial cable 19 and the coaxial cable 20, respectively.

If required, the jack 46 receives a data processing network cable of the patch cord type for cascading the unit 40 with another unit 40 for telephone signals and local area network signals: the wiring of the contacts of the jack 46 is similar to that of the jacks 15 except that the pair of contacts 7 and 8 is for telephone signals, not television signals. The printed circuit board in the concentrator 42 connects the contacts 1, 2, 3 and 6 to the electronic unit 17 and each of the contacts 4, 5, 7 and 8 to a respective conductor of the cable 13.

To cascade the unit 40 with a similar unit for television signals, the plug 44 on whichever of the two units 40 receives the cable 12 is connected to one end of a coaxial cable whose other end is plugged into the plug 43 of the other unit 40, and the cable 19 is plugged into the plug 44 of that other unit.

The jack 47 receives the telephone cable 21.

Four of the screw terminals of the terminal block 48 receive the conductors of the telephone cable 13. The other two screw terminals of the terminal block 48 receive the DC power supply cable connected to the unit 37.

The telephone cable 13 is connected between the passage 28 and the terminal block 48 by the jacks 39.

In its upper portion the concentrator 42 has eight RJ 45 category 6 jacks 49A to 49H.

Each of the jacks 49A to 49H receive the end of a patch cord 49' (FIG. 7) whose other end is received in one of the jacks on the panel 41. Each of the cables 14A to 14H is connected to one of the jacks on the patch panel 41. Accordingly, each of the cables 14A to 14H is connected to one of the jacks 49A to 49H via a patch panel 41 and a patch cord 49'.

Figures 7, 8:
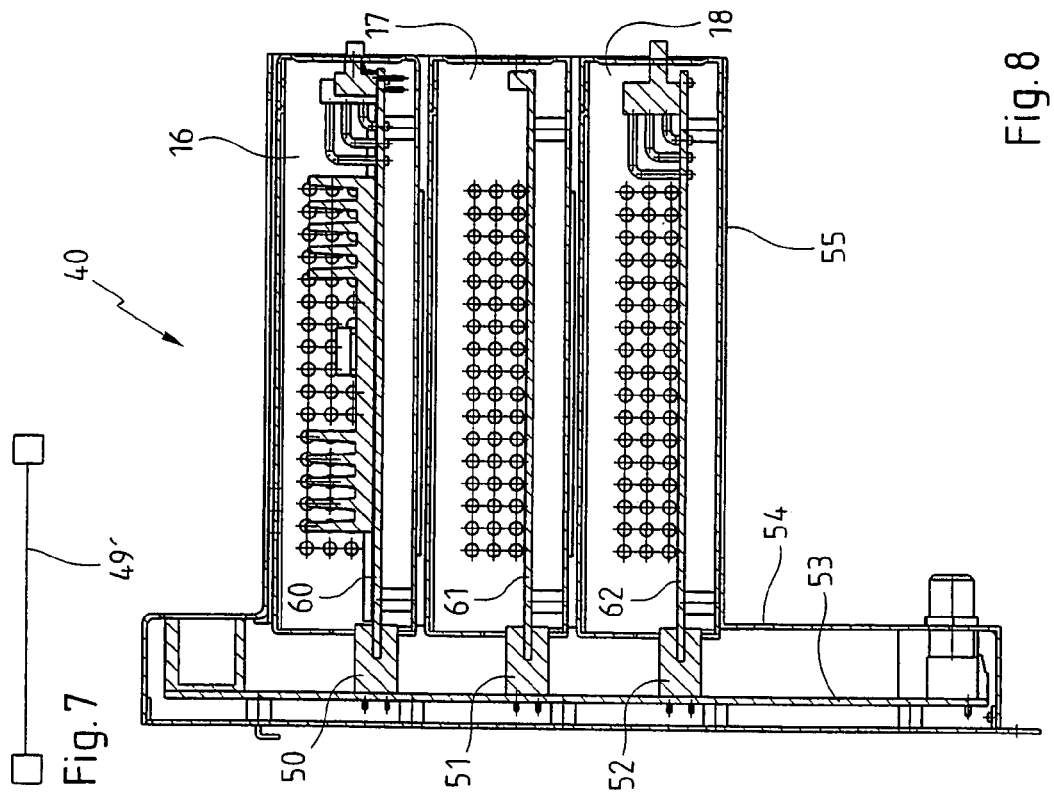
FIG. 7 is a schematic representation of a patch cord used in the cabinet.
FIG. 8 is a sectional view in side elevation of the distribution unit.

The concentrator 42 also has three connectors 50, 51 and 52 each receiving a plug connecting the unit 16, the unit 17 and the unit 18, respectively, as may be seen in FIG. 8 in particular.

The F plugs 43 to 45, the RJ 45 jacks 46 and 47, the terminal block 48, the jacks 49A to 49H, and the connectors 50 to 52 are each connected to a printed circuit board 53 which makes the connections required, as explained later with reference to FIGS. 9 and 10 in particular.

The plugs, jacks, terminal block and connectors that are connected to the board 53 and the board itself are mounted on a metal chassis 54 that surrounds the board 53 and has a projecting annular rectangular-section protuberance 55 surrounding the connectors 50 to 52. The protuberance 55 forms three housings 56, 57 and 58 to receive the units 16, 17 and 18, respectively.

Each of these units includes a metal casing inside which is a respective electronic circuit board 60, 61 and 62 (FIG. 8).

Ventilation holes are provided in the casing of each of the units 16, 17 and 18 and corresponding apertures are provided on the protuberance 55.

The electronic circuit board of each of the units 16, 17 and 18 carries indicators and/or pushbuttons that are visible and/or accessible on the front panel of the units 16, 17 and 18.

The rear end of the printed circuit board of each of the units 16, 17 and 18 forms a plug that is received into the corresponding connector 50, 51 or 52.

As indicated hereinabove, the printed circuit board 53 connects the plug 43 to the active electronic unit 16, the two telephone pairs connected to the terminal block 48 to the active electronic unit 18, each of the jacks 46 and 49A to 49H to the active electronic unit 17, and each of the jacks 49A to 49H to the active electronic units 16 and 18.

Furthermore, the board 53 connects the two screw terminals of the terminal block 48 connected to the DC power supply cable to each of the units 16, 17 and 18 and makes the connections mentioned above between the terminal block 48 and the jacks 46 and 47 and between the plug 43 and the plugs 44 and 45.

As shown highly schematically in FIGS. 9 and 10, the board 53 comprises four stacked layers 65 to 68 each comprising a dielectric substrate and conductive metal tracks or lands disposed on the substrate.

In FIG. 9, the general path of the telephone signals is represented by the long dashed line 69, the path of the local area network signals corresponding to one of the twisted pairs of conductors is represented by the short dashed line 70, and the path of the signals corresponding to the other pair is represented by the chain dotted line 71.

It may be seen that the path 69 of the telephone signals lies essentially in the layer 65, which is the rearmost layer, i.e. the layer farthest away from the plugs, jacks, terminal block and connectors 43 to 48, 49A to 49H and 50 to 52.

Vias convey these signals through the other layers 66, 67 and 68, respectively, from the rear toward the front, at the level of the terminal block 48 and the jacks 46 and 47, at the level of the connector 52 and at the level of the jacks 49A to 49H.

The local area network signals whose path is shown by the lines 71 and 70 lie essentially in the intermediate layers 66 and 67, respectively. Vias enabling these signals to pass through the layer 68 and where applicable the layer 67 are provided at the level of the jack 46, at the level of the connector 51, and at the level of the jacks 49A to 49H.

In practice, each of the paths shown by the lines 69, 71 and 70 corresponds to a track on the layers 65, 66 and 67 for each conductor of the corresponding cables, namely:

in the layer 65, for the path represented by the lines 69, four tracks each corresponding to one of the screw terminals of the terminal block 48 between the latter and the connector 52, while between the connector 52 and each of the jacks 49A to 49H there are two tracks corresponding to the pair of contacts 4 and 5 of that jack;

in each of the layers 66 and 67, for the paths represented by the line 71 and by the line 70, respectively, two tracks corresponding respectively to the pair of contacts 1 and 2 and to the pair of contacts 3 and 6 of the jack 46 between the latter and the connector 51 and likewise between the connector 51 and each of the jacks 49A to 49H.

In the example shown, for each of the jacks 49A to 49H, by virtue of the eight pushbuttons 72 that it has on its front panel, the active electronic unit 18 selects which of the two lines provided by the cable 13 is present at the pair of contacts 4 and 5 of the corresponding jack 49A to 49H and therefore at the pair of contacts 4 and 5 of the jack 15 at which the corresponding cables 14A to 14H terminate.

Also in the example shown, the electronic unit 17 is a multiport repeater for local area networks, to be more precise an ETHERNET 10/100 base T Switch repeater in this example.

The indicators 73 on the front panel of the unit 17 provide a status indication for each of the two pairs of contacts concerned (pair 1 and 2 and pair 3 and 6) of each of the jacks 49A to 49H.

The path of the television signals is shown in FIG. 10 by the short dashed line 74.

It will be noted first of all that the board 53 carries eight converters 75 for converting unbalanced signals, such as those propagating in a coaxial cable, into balanced signals, such as those propagating in a twisted pair of conductors.

The input (unbalanced signal) of each converter 75 is connected firstly to a track of the front layer 68 and secondly to the conductive land 76 of the layer 65 and the output of each converter 75 (balanced signal) is connected to two tracks of the layer 68.

Between the plug 43 and the input of the distributor-coupler on the board 53 mentioned above (not shown), and between one of the outputs of that distributor and the connector 50, the television signals propagate on the board 53 in a track of the layer 68 and in the land 76, which additionally constitutes a ground plane.

Between the connector 50 and each of the converters 75, the television signals propagate on the board 53 in a track of the layer 68 and in the land 76.

Between each converter 75 and the corresponding jack 49A to 49H, the television signals, which are balanced at this stage, propagate on the board 53 in two tracks of the layer 68.

In line with the conductive tracks of the layer 68 conveying balanced television signals, the layer 67 has a conductive land 77 that is not used directly for signal propagation but provides a ground plane useful for impedance matching and for electromagnetic compatibility, in particular with regard to protection against crosstalk.

The regions of the board 53 in which telephone signals and local area network signals propagate, in the manner shown in FIG. 9, and the regions in which television signals propagate, in the manner shown in FIG. 10, are separate, of course.

More generally, the layers 66 and 67 comprise no conductive tracks between the land 76 and the conductive tracks of the layer 68 in which television signals propagate.

The active electronic unit 16 is an amplifier-distributor for unbalanced television signals.

It includes in particular an amplifier followed by a distributor to distribute each of the eight output channels to one of the jacks 49A to 49H and, for each of those channels, a pushbutton 78 on the front panel for selecting whether the corresponding jack 49A to 49H is fed with television signals or not.

It will be observed that the connector 50 receiving the active electronic unit 16 is that nearest the jacks 49A to 49H, which minimizes the length of the path on the board 53 of television signals leaving the unit 16, which is good for preventing attenuation of and interference with those signals on the board 53.

It will likewise be observed that the converters 75 are as close as possible to the jacks 49A to 49H, which minimizes the path on the board 53 of balanced television signals, which is good for preventing interference with this signal, which is highly sensitive to interference given the frequencies used (up to 862 MHz).

The connector 52 receiving the telephone active electronic unit 18 is farthest from the jacks 49A to 49H and the path of telephone signals between the unit 18 and the jack 49A to 49H is therefore relatively long. Also, these signals propagate in the rearmost layer 65.

In practice this has no drawbacks as telephone signals are relatively robust.

Finally, the connector 51 is at an intermediate position between the connectors 50 and 52, as are the intermediate layers 66 and 67 of the board 53 in which local area network signals propagate. This is compatible with the sensitivity of local area network signals, which have an intermediate sensitivity between that of telephone signals and that of television signals.

The jacks 49A to 49H, the connector 50, the connector 51, the connector 52, the plugs 43 to 45, the jacks 46 and 47, and the terminal block 48 are arranged in five successive rows; dedicating the connectors 50, 51 and 52 to respective types of signals to be processed and the chosen distance between them in the two outermost rows, as well as the dedication of the layers of the board 53 to the different types of signal to be propagated, provides a particularly simple, convenient and economic way to reconcile the hardware implementation of the various connections to be made with constraints in respect of impedance matching and electromagnetic compatibility in particular, to prevent attenuation of and interference with the signals concerned.

The arrangement of the signal distribution unit 40 with the board 53 vertical and the active electronic units 16, 17 and 18 horizontal is particularly beneficial from the overall size and accessibility points of view.

Placing display devices (such as the indicators 73 of the unit 17) or configuration devices (such as the pushbuttons 72 or 78) on the front panel of the active electronic units is also particularly advantageous in terms of accessibility, noting that the window 29 ensures that access is preserved even when the cover 26 is in place on the base 25.

Generally speaking, the wiring concentrator 42 comprises only passive units. All active components of the signal distribution unit 40 are incorporated into the unit 16, 17 or 18.

Dedicating each of these three units to a particular type of signal is also advantageous in terms of modularity.

Thus, if required, initially only one of the units 16 to 18 may be used and the signal distribution installation modified afterwards by adding the missing active units.

It is, of course, possible to use the unit 40 elsewhere than in a cabinet such as the cabinet 11 and/or with a different orientation, for example with the jacks 49A to 49H at the bottom instead of at the top.

In a variant that is not shown, the cable 13 is connected to a private telephone network rather than a public network and/or to a digital telephone network rather than a switched telephone network.

In other variants that are not shown, the number, disposition and nature of the connection terminals of the plugs 43 to 45, the terminal block 48, and the jacks 46, 47 and 49A to 49H is different, for example one or more of the plugs 44 and 45 and the jacks 46 and 47 are dispensed with, the jacks 49A to 49H have a format other than the RJ 45 format and/or their number is other than eight, and/or the connectors 50, 51 and 52 have a different format or are arranged differently, for example other than in rows parallel to the connection terminals.

In further variants that are not shown, the printed circuit board 53 is replaced by a board arranged differently and in particular by a board having a number of layers other than four.

In still further variants that are not shown, the active electronic units 16, 17 and 18 are replaced by units processing the same type of signals but of a different kind; for example, the unit 17 formed here of an ETHERNET switch is replaced by a different type of multiport repeater for local area networks.

In yet further variants that are not shown, the signal distribution unit 40 constitutes a stand-alone device provided with its own power supply.

Many other variants are feasible, depending on circumstances, and it should be remembered that the invention is not limited to the examples described and shown.

There is claimed:

1. A wiring concentrator comprising:
    a first connection terminal (43) adapted to receive a television signal distribution cable (12);
    a second connection terminal (48) adapted to receive a telephone network cable (13);
    a plurality of third connection terminals (49A–49H) each adapted to receive a local area network cable (49');
    a first connector (50) adapted to receive an active electronic unit (16) for processing television signals;

a second connector (52) adapted to receive an active electronic unit (18) for processing telephone signals;

a third connector (51) adapted to receive an active electronic unit (17) for processing local area network signals;

a printed circuit board (53) to which each of said first, second and third connection terminals (43, 48, 49A–49H) and each of said first, second and third connectors (50, 52, 51) are connected, said printed circuit board (53) connecting said first connection terminal (43) to said first connector (50), said second connection terminal (48) to said second connector (52), and each of said third connection terminals (49A–49H) to each of said first, second and third connectors (50, 52, 51), and a chassis (54) on which said printed circuit board (53), each of said first, second and third connection terminals (43, 48, 49A–49H), and each of said first, second and third connectors (50, 52, 51) are mounted, which chassis (54) includes a housing (56, 57, 58) for each active electronic unit.

2. The concentrator claimed in claim 1 wherein said third connection terminals (49A–49H) are grouped in a line and each of said first, second and third connectors (50, 52, 51) is elongate, with said third terminals (59A–59H), said first connector (50), said second connector (52), and said third connector (51) which are disposed in successive rows.

3. The concentrator claimed in claim 2 wherein said first connector (50) is nearest said third connection terminals (59A–59H).

4. The concentrator claimed in claim 3 wherein said second connector (52) is farthest from said third connection terminals (49A–49H) with said third connector (51) which is between said first connector (50) and said second connector (52).

5. The concentrator claimed in claim 2 wherein said first connection terminal (43) and said second connection terminal (48) are grouped in a line, with said third connection terminals (49A–49H), said first connector (50), said second connector (52), said third connector (51), and the group comprising said first terminal (43) and said second terminal (48) which are disposed in successive rows.

6. The concentrator claimed in claim 1 wherein:

said first connection terminal (43) and said second connection terminal (48) are disposed at a first end of said concentrator (42);

said third connection terminals (49A–49H) are disposed at a second end of said concentrator (42); and said first connector (50), said second connector (52) and said third connector (51) are between said first end and said second end with said first connector (50), which is nearest said second end.

7. The concentrator claimed in claim 6 wherein said second connector (52) is nearest said first end and said third connector (51) is between said first connector (50) and said second connector (52).

8. The concentrator claimed in claim 1, further comprising a fourth connection terminal (44) adapted to receive a second television signal distribution cable (19).

9. The concentrator claimed in claim 8 wherein said printed circuit board (53) carries a distributor having an input connected to said first connection terminal (43), a first output for terrestrial television signals connected to said first connector (50), and a second output for all television signals connected to said fourth connection terminal (44).

10. The concentrator claimed in claim 1, further comprising a fifth connection terminal (45) adapted to receive a third television signal distribution cable (20).

11. The concentrator claimed in claim 10 wherein said printed circuit board (53) carries a coupler having a first input connected to said first terminal (43), a second input connected to said fifth terminal, and an output connected to said first connector (50).

12. The concentrator claimed in claim 1, further comprising a fourth connection terminal (44) adapted to receive a second television signal distribution cable (19) and a fifth connection terminal (45) adapted to receive a third television signal distribution cable (20), and wherein said printed circuit board (53) carries a distributor-coupler having a first input connected to said first connection terminal (43), a second input connected to said fifth connection terminal (45), a first output, for terrestrial television signals, connected to said first connector (50), and a second output, for all television signals, connected to said fourth connection terminal (44).

13. The concentrator claimed in claim 1, further comprising a sixth connection terminal (46) adapted to receive a local area network cable (21), with said printed circuit board which connects said sixth connection terminal (46) to said second terminal (48) and to said third connector (51).

14. The concentrator claimed in claim 1, further comprising a seventh connection terminal (47) adapted to receive a telephone network cable (21), with said printed circuit board (53) which connects said second connection terminal (48) to said seventh connection terminal (47).

15. The concentrator claimed in claim 1, further comprising at least one connection terminal (44–47) other than said first connection terminal (43), said second connection terminal (48) 6r said third connection terminal (49A–49H), with said first connection terminal (43), said second connection terminal (48), and each of said other connection terminals (44–47) grouped in a line.

16. The concentrator claimed in claim 1 wherein said printed circuit board (53) has a plurality of stacked layers (65–68) each comprising a dielectric substrate and conductive metal tracks or lands (76, 77) on said substrate.

17. The concentrator claimed in claim 16 wherein said printed circuit board (53) has a first layer (65) and a second layer (68) for connecting said first connection terminal (43) to said first connector (50).

18. The concentrator claimed in claim 17 wherein said printed circuit board (53) carries, for each of said third terminals (49A–49H), a converter (75) for converting an unbalanced signal into a balanced signal, with each of said converters (75) having an input connected to said first connector (50) by said first layer (65) and by said second layer (68), and an output connected to said third connection terminal (49A–49H) via only said second layer (68).

19. The concentrator claimed in claim 18 wherein each of said converter (75) is between said third connection terminal (49A–49H) and said first connector (50).

20. The concentrator claimed in claim 17 wherein each of said connection terminals (43–48, 49A–49H) and each of said connectors (50–52) is disposed on the same side of said printed circuit board (53), with said first layer (65) that is farthest from it and. with said second layer (68) that is nearest it.

21. The concentrator claimed in claim 17 wherein said first layer (65) of said printed circuit board (53) carries conductive tracks for connecting said second connection terminal (48) to said second connector (52) and for connecting said second connector (52) to each of said third connection terminals (49A–49H).

22. The concentrator claimed in claim 17 wherein said printed circuit board (53) carries between said first layer (65) and said second layer (68) a third layer (66) comprising conductive tracks for connecting each of said third connection terminals (49A–49H) to said third connector (51).

23. The concentrator claimed in claim 22 wherein said printed circuit board (53) comprises a fourth layer carrying other conductive tracks for connecting each of said third connection terminals (49A–49H) to said third connector (51).

24. The concentrator claimed in claim 1 wherein said first connection terminal (43) is to an F format terminal, said second connection terminal (48) is a screw terminal block and said third connection terminals (49A–49H) are RJ 45 format terminals.

25. The concentrator claimed in claim 1 wherein each of said first, second and third connectors (50, 52, 51) is adapted to accommodate a portion of a printed circuit board (60, 61, 62).

26. A signal distribution unit comprising a wiring concentrator (42) as claimed in claim 1 and at least one active electronic unit (16) for processing television signals, one active electronic unit (18) for processing telephone signals, and one active electronic unit (17) for processing local area network signals disposed in one of said housings (56, 57, 58) of said chassis (54) and received in a respective one of said first, second and third connectors (50, 52, 51).

27. The unit claimed in claim 26 wherein each of said active electronic units comprises an electronic circuit board (60–62) and a casing having on a front panel at least one display member and/or one configuration member (72, 73, 78) and at the rear a plug for connection to one of said first, second and third connectors (50, 52, 51).

28. The unit claimed in claim 27, wherein each of said connection plugs is part of a printed circuit board (60–62) of said active electronic unit (16–18).

29. A cabinet for a signal distribution installation, comprising at least one signal distribution unit (40) as claimed in claim 26 and a DC power supply unit (37).

30. The cabinet claimed in claim 29, further comprising a patch panel (41) and/or at least one test telephone jack (39).

* * * * *